United States Patent Office 2,966,439
Patented Dec. 27, 1960

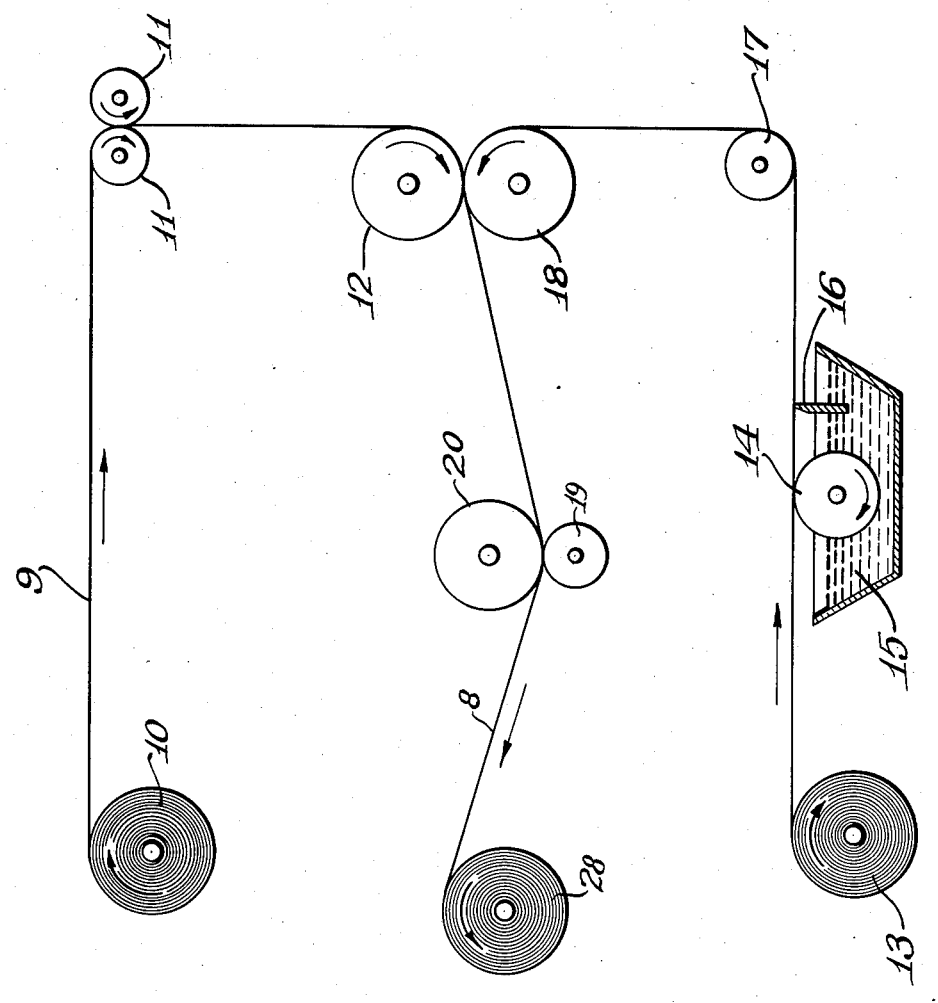

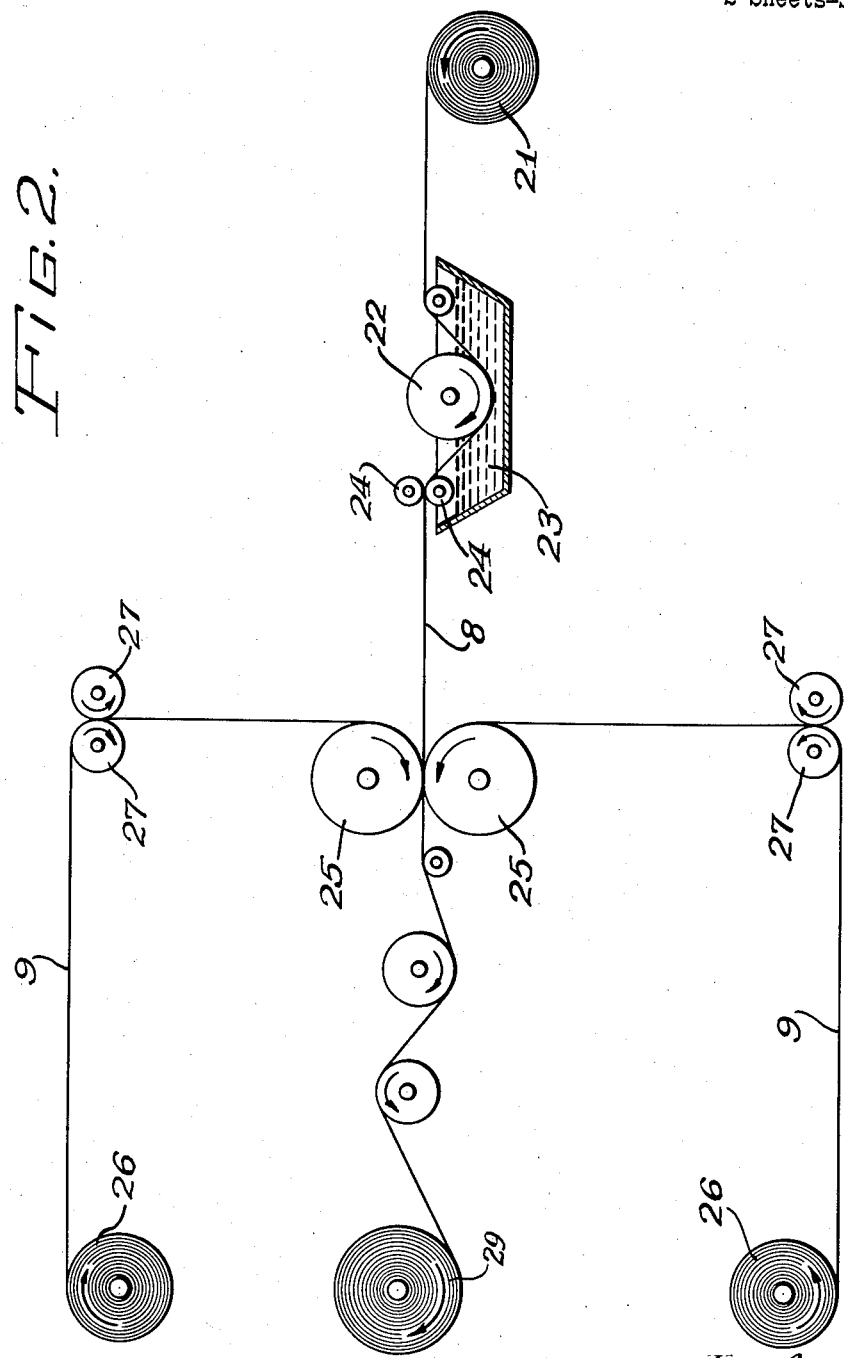

2,966,439

LAMINATION OF SHRINKABLE FILMS

Frederick Sorel, Chicago, Ill., assignor to Arvey Corporation, Chicago, Ill., a corporation of Delaware Filed Aug. 28, 1956, Ser. No. 606,679

9 Claims. (Cl. 154—139)

This invention relates to the production of laminates in which one or more plies are composed of normally shrinkable thermoplastic film material, and more particularly to the production of laminates composed of one or more plies of normally shrinkable plastic film material laminated to one or more plies of relatively stable, that is inextensible and incontractible, sheet material such as paper or paperboard, characterized by the fact that the aforesaid normally shrinkable film material is in a stable and no longer undesirable shrinkable condition.

It is known that certain plastic film materials, particularly those which have been formed by extrusion processes where they have been stretched while hot and cooled in such condition, are subject to shrinking when subjected to heat.

One type of plastic film particularly possessing such properties is polyvinylidene chloride, sometimes in combination with vinyl chloride and known commercially as Saran. Another is shrinkable polyethylene.

Thus, for example, Saran which because of its high molecular density provides a strong barrier to the passage of gases and is thus desirable for certain insulating bodies, has the undesirable characteristic or tendency to break away from the reinforcing backing to which it is laminated, on being subjected to elevated temperatures of even a relatively low order such as for example exposure to hot sun, with more aggravating conditions occurring at higher temperatures to which the laminate may be exposed in usage and storage.

With respect to the aforesaid films, even though in some commercial varieties a great proportion of stretch is eliminated, nevertheless even the so-called nonshrinking varieties of the Saran have a shrink property of about 20% which is accelerated by heat, and the normally shrinkable varieties may shrink as much as about 50%. The same substantially holds true with respect to polyethylene films.

It is the object of the present invention to eliminate the aforesaid deficiencies of laminates composed of one or more layers of flexible, normally nonstretchable and nonshrinkable material with one or more layers of normally shrinkable thermoplastic film material and to enable the production of such laminates wherein the said film material remains securely adhered in a unitary structure with the reinforcing backing or covering.

The objects of the present invention are accomplished in general by a controlled manner of feeding the normally shrinkable thermoplastic film material where it is being laminated to paper or other flexible, relatively dimensionally stable backing material and by using differential speed rolls for feeding the respective components. That is to say, when the shrinkable film material is to be laminated with one or more plies of paper, the paper is fed at one rate and coated with the adhesive, and the shrinkable film material is fed to the laminating rolls at a slightly faster rate than the paper, or at a rate correlated to its shrinkability under the conditions of lamination, but controlled so that the plastic film does not wrinkle but rather becomes bonded to the paper sheet in a smooth laminate.

Further objects of the invention, its details and the manner of carrying out the process thereof will be apparent from a consideration of the accompanying diagrammatic drawings, wherein:

Fig. 1 illustrates the lamination of a sheet of paper to a sheet of normally shrinkable plastic film material.

Fig. 2 illustrates the lamination of a sheet of paper between two covering layers of normally shrinkable film material.

Referring to the drawings, and particularly to Fig. 1, the plastic film 9 is let off from supply roll 10 and passes between the driven feed rolls 11, 11 and over heated driven laminating roll 12 in a manner whereby the web is wrapped around and thus held in intimate contact with about 90° of the roll 12, so that it may be heated thereby. The roll 12 may be heated in a suitable manner, as by steam or electrical resistance controlled to the desirable temperature, such as anything from a few degrees above normal room temperature to below the melting point of the plastic material being laminated. In the case of polyvinylidene chloride Saran film where maximum shrinkage is desired, the temperature can be from about 200 to about 240° F.

The paper 8 to be laminated to the plastic film may be supplied from the let-off roll 13, passed over the adhesive applicator roll 14 rotating in a body of adhesive 15, such as a solvent solution of vinyl resin, the excess doctored off by means of the doctor blade 16, and then with the adhesive side outwardly passed over roll 17 to laminating roll 18 where it meets the plastic film passing around heated laminating roll 12.

The feed rolls 11, 11 and the laminating rolls 12, 18 are driven at differential speeds so that the plastic film 9 is fed at a faster rate to the roll 12 than is the backing paper sheet 8. Thus, for example, if a Saran film capable of 50% shrink is desired to be completely relaxed and laminated in such relaxed condition to the paper web 8, the rolls 11, 11 are driven at twice the speed of the rolls 12, 18, substantial contraction being effected during the contact of web 9 with the heated surface of laminating roll 12, so that the two jointly pass between the nip of the rolls 12, 18 at a uniform wrinkle-free rate. On the other hand, when the film is 20% shrinkable, the rolls 11, 11 will be driven with respect to the rolls 12, 18 at the rate of five to four.

Thereafter the laminate passes between the rolls 19, 20, the latter being in contact with the plastic film 9, and cooled as by means of cold water, after which the laminate may be wound up for storage on wind-up roll 28; or in lieu thereof the laminate may be passed to apparatus such as continuous bagmaking machines; or as an alternative, it may be severed in lengths of desired size rather than being wound up for use as desired.

On example of the utility of the foregoing laminate is in the production of envelopelike sealed bags containing fibrous material and Freon gas for use in the production of insulating wall structures. Examples of other uses are electrical insulation and other protective materials or fabrics where stability of coating or covering is desired with high resistance to moisture penetration.

The relaxed Saran film provides a strong barrier to the passage of the gas and in its present stabilized condition is capable of withstanding conditions of temperature which would ordinarily cause blistering or separation of laminate formed of the same materials but wherein the Saran was fed at the same rate as the paper, or in a stretched condition.

Fig. 2 illustrates a similar arrangement but wherein a ply of paper 8 is laminated between two plies of plastic film 9. In this case the paper fed from supply roll 21 passes beneath the adhesive roll 22 in fountain 23 so that both sides of the paper are coated with adhesive, excess being doctored off by the doctor rolls 24, 24 and the paper passed between the heated, driven laminating rolls 25, 25. In this case, each sheet of plastic 9 after being let off from its roll 26 passes between a pair of driven feed rolls 27, 27, each of the feed roll pairs 27, 27 being driven at the same rate but at a relatively greater speed than that of the driven laminating rolls 25, 25 and finally wound up on roll 29.

Although not illustrated, it will be understood that as another alternative a sheet of shrinkable thermoplastic film material may be laminated between two opposed or covering plies of paper or the like relatively dimensionally stable sheet material by modification of the arrangement of Fig. 1, that is, by bringing the adhesive coated surface of a second sheet of paper into contact with the plastic film side of the laminate emerging between rolls 19 and 20 in Fig. 1 prior to wind-up thereof.

It will be understood therefore that other modifications may be made in the scope of the present invention without departing from the spirit thereof, except as comprehended by the following claims.

I claim:

1. A laminated product comprising a film of normally thermo-shrinkable material in thermo-shrunk condition and a ply of normally dimensionally thermo-stable material.

2. A laminated product comprising a ply of normally thermo-shrinkable polyvinylidenechloride film material bonded in thermo-shrunk condition to a ply of normally dimensionally thermo-stable sheet material.

3. A laminated product comprising a ply of normally thermo-shrinkable polyvinylidenechloride film material bonded in thermo-shrunk condition to a ply of felted fibrous sheet material.

4. The product of claim 1 wherein said ply of thermo-shrunk material is bonded between plies of said thermo-stable material.

5. The product of claim 1 wherein said ply of thermo-stable material is bonded between plies of said thermo-shrunk material.

6. The process of producing a laminate of heat-shrinkable thermoplastic film material in heat-shrunk dimensionally stable condition and a second relatively dimensionally stable sheet material, which comprises bonding said materials together by passing them between a pair of oppositely rotating surfaces while heating and permitting said heat-shrinkable material to shrink thereat immediately adjacent the point of lamination, and recovering a smooth laminate wherein said film material remains securely adhered in a unitary structure with said sheet material.

7. The process of producing a laminate of heat-shrinkable thermoplastic film material in heat-shrunk dimensionally stable condition and a second relatively dimensionally stable sheet material, which comprises bonding said materials together by passing them between a pair of oppositely rotating surfaces while heating and permitting said heat-shrinkable material to shrink thereat by feeding it to said rotating surface at a rate greater than that at which said thermo-stable material is fed thereto.

8. The process of producing a dimensionally stabilized laminate of heat-shrinkable polyvinylidenechloride film material and a second relatively dimensionally stable reinforcing sheet material therefor, which comprises bonding said materials together between a pair of oppositely rotating surfaces at least one of which is heated to a temperature conducive to the shrinking of said heat-shrinkable material by passing said heat-shrinkable material between said surfaces, and in appreciable surface contact with the heated one of said surfaces, at a linear speed greater than that at which the relatively dimensionally stable sheet is fed thereto.

9. The process of producing a dimensionally stabilized laminate of heat-shrinkable polyvinylidene chloride film material and a second relatively dimensionally stable reinforcing sheet material therefor, which comprises bonding said materials together between a pair of oppositely rotating surfaces at least one of which is heated to a temperature conducive to the shrinking of said heat-shrinkable material by passing said heat-shrinkable material in a relaxed condition between said surfaces, and in appreciable surface contact with the heated one of said surfaces while feeding said dimensionally stable sheet thereto in a relatively tensioned condition, cooling the resulting composite to a lower temperature upon emergence from between said rotating surfaces, and recovering a smooth laminate wherein said film material remains securely adhered in a unitary structure with said sheet material.

References Cited in the file of this patent

UNITED STATES PATENTS

| Number | Name | Date |
|---|---|---|
| 1,792,316 | Leguillon | Feb. 10, 1931 |
| 1,806,811 | Lough | May 26, 1931 |
| 1,961,914 | Richter et al. | June 5, 1934 |
| 1,983,870 | Ostwald | Dec. 11, 1934 |
| 2,275,262 | Malhiot | Mar. 3, 1942 |
| 2,484,484 | Berry | Oct. 11, 1949 |
| 2,517,570 | Irons | Aug. 8, 1950 |
| 2,517,581 | Lowry et al. | Aug. 8, 1950 |
| 2,565,316 | Lucas et al. | Aug. 21, 1951 |
| 2,603,838 | Lowry et al. | July 22, 1952 |
| 2,605,196 | Bostwick | July 29, 1952 |
| 2,668,572 | Bostwick | Feb. 9, 1954 |
| 2,701,221 | Clayton et al. | Feb. 1, 1955 |
| 2,737,701 | Hubbard et al. | Mar. 13, 1956 |
| 2,746,898 | Buckwalter et al. | May 22, 1956 |
| 2,797,656 | Reid | July 2, 1957 |
| 2,821,457 | Erlich | Jan. 28, 1958 |